United States Patent
Komaki et al.

(10) Patent No.: US 7,688,025 B2
(45) Date of Patent: Mar. 30, 2010

(54) ELECTRONIC DEVICE, BATTERY PACK, POWER-SUPPLY CONTROLLING METHOD FOR ELECTRONIC DEVICE, PROGRAM FOR CONTROLLING POWER SUPPLY FOR ELECTRONIC DEVICE

(75) Inventors: Keiichi Komaki, Tokyo (JP); Norio Fujimori, Tokyo (JP); Takayuki Yajima, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/124,541

(22) Filed: May 6, 2005

(65) Prior Publication Data

US 2005/0248311 A1   Nov. 10, 2005

(30) Foreign Application Priority Data

May 7, 2004   (JP)   ............... 2004-138967

(51) Int. Cl.
 *H02J 7/00*   (2006.01)
(52) U.S. Cl. ............... 320/106; 112/122; 112/DIG. 12; 112/DIG. 18
(58) Field of Classification Search ................. 320/106, 320/112, 122, DIG. 12, DIG. 18
See application file for complete search history.

(56) References Cited

U.S. PATENT DOCUMENTS

| | | | |
|---|---|---|---|
| 5,963,010 A * | 10/1999 | Hayashi et al. ............. | 320/106 |
| 6,087,803 A * | 7/2000 | Eguchi et al. ............... | 320/106 |
| 6,215,275 B1 * | 4/2001 | Bean ........................... | 320/106 |
| 6,236,186 B1 * | 5/2001 | Helton et al. ............... | 320/106 |
| 6,538,413 B1 * | 3/2003 | Beard et al. ................. | 320/114 |
| 6,741,065 B1 * | 5/2004 | Ishii et al. ................... | 320/122 |
| 7,227,333 B2 * | 6/2007 | Yamada et al. .............. | 320/106 |
| 2005/0035738 A1 * | 2/2005 | Patino et al. ................ | 320/106 |

FOREIGN PATENT DOCUMENTS

| | | |
|---|---|---|
| JP | 2-77733 | 6/1990 |
| JP | 5-198293 | 8/1993 |
| JP | 6-20724 | 1/1994 |
| JP | 08-065559 | 3/1996 |
| JP | 9-243718 | 9/1997 |
| JP | 11-271407 | 10/1999 |
| JP | 2000-60007 | 2/2000 |
| JP | 2002-223527 | 8/2002 |
| JP | 2003-173220 | 6/2003 |
| WO | WO 94/10718 | 5/1994 |

* cited by examiner

*Primary Examiner*—Edward Tso
*Assistant Examiner*—Samuel Berhanu
(74) *Attorney, Agent, or Firm*—Oblon, Spivak, McClelland, Maier & Neustadt, L.L.P.

(57) ABSTRACT

An electronic device includes a battery-pack installing portion that holds a battery pack in a detachable manner; sensing means for sensing that a battery pack is installed in the battery-pack installing portion; detecting means for detecting data related with a state of the installed battery pack sensed by the sensing means; determining means for determining whether the battery pack has a fault based on the detected data; and first restricting means for restricting a recharging operation of the battery pack if the battery pack is determined to have the fault by the determining means.

19 Claims, 8 Drawing Sheets

ELECTRONIC DEVICE, BATTERY PACK, POWER-SUPPLY CONTROLLING METHOD FOR ELECTRONIC DEVICE, PROGRAM FOR CONTROLLING POWER SUPPLY FOR ELECTRONIC DEVICE

CROSS REFERENCES TO RELATED APPLICATIONS

The present invention contains subject matter related to Japanese Patent Application JP 2004-138967 filed in the Japanese Patent Office on May 7, 2004, the entire contents of which are incorporated herein by reference.

BACKGROUND OF THE INVENTION

1. Field of the Invention

The present invention relates to electronic devices, such as personal computers; battery packs used as power supply for electronic devices; power-supply controlling methods for electronic devices provided with such battery packs; and programs for controlling power supply for electronic devices.

2. Description of the Related Art

In related art, portable electronic devices, such as notebook computers, can generally be driven with battery packs. Such electronic devices are provided with, for example, a unit that displays the level of power remaining in a battery pack installed in the device and that warns a user if the remaining power falls below a certain level. This may prevent the battery pack from becoming exhausted during operation and may thus prevent currently running programs and data from becoming damaged.

Furthermore, Japanese Unexamined Patent Application Publication No. 8-65559 (see paragraphs [0011] to [0013], and FIG. 3), for example, discloses an electronic device that solves problems related with a case where a battery pack contains a different type of battery. Specifically, in order to achieve this, such an electronic device determines the specification of the battery pack, detects the remaining power level, and displays the remaining power level.

SUMMARY OF THE INVENTION

According to the above disclosure, the remaining power level is displayed in order to correspond to a battery pack that contains a different type of battery. However, an indication that a battery pack is at the end of its battery life or has a fault is performed simply by turning on an LED (light emitting diode), meaning that full accurate information regarding the condition of the battery pack is not displayed promptly to users.

Furthermore, there are also cases where, for example, a battery pack has a connection failure, and because the user does not notice such an abnormal state, an undesirable recharging operation is continuously performed on the abnormal battery pack.

Furthermore, it is also problematic that even when a battery pack whose safety is not confirmed, such as a battery pack near the end of its battery life or a battery pack with a fault, is installed in an electronic device, the electronic device is still activated. Moreover, if an AC adaptor is attached to the electronic device, a recharging operation is performed on such a battery pack.

Accordingly, it is desirable to provide an electronic device, a battery pack used as power supply for such an electronic device, a power-supply controlling method for the electronic device provided with such a battery pack, and a program for controlling the power supply for the electronic device that can readily inform a user of information related with a fault in the battery pack, and that are capable of restricting, for example, an undesirable recharging operation or undesirable activation.

An electronic device according to an embodiment of the present invention includes a battery-pack installing portion that holds a battery pack in a detachable manner; sensing means for sensing that a battery pack is installed in the battery-pack installing portion; detecting means for detecting data related with a state of the installed battery pack sensed by the sensing means; determining means for determining whether the battery pack has a fault based on the detected data; and first restricting means for restricting a recharging operation of the battery pack if the battery pack is determined to have the fault by the determining means.

The term "data related with a state of the installed battery pack" refers to data for determining the safety of using the installed battery pack. For example, such data is used for determining whether the battery pack is at the end of its battery life, has a fault, or is compliant with the electronic device. The data may include, for example, information related with the data of manufacture and the number of previous recharging operations performed on the battery pack. On the other hand, the term "the battery pack has a fault" refers to a condition of the battery pack. The term "fault" may include, for example, a state where the battery pack is near or at the end of its battery life; the battery pack has a connection failure; the battery pack has a defective control circuit; and the battery pack is not compliant with the electronic device.

According to this embodiment of the present invention, if it is determined that the installed battery pack has a fault, such as being at the end of its battery life, the recharging operation of the battery pack, for example, is stopped instantly so that an unnecessary recharging operation of that battery pack can be prevented automatically.

Furthermore, the electronic device may further include second restricting means for restricting activation of the electronic device if a removal of the battery pack determined to have the fault is not sensed by the sensing means and when the electronic device is in a non-activated state or in a sleep mode. Accordingly, if the electronic device, such as a notebook computer, is not activated yet, the electronic device can be prevented from being activated by the battery pack determined as having the fault, thereby ensuring the safety of the electronic device.

Moreover, if, for example, the battery pack is determined to have a fault during the activation of the electronic device, such as a notebook computer, and the electronic device is thus switched to a sleep mode, the electronic device is prevented from being reactivated until the removal of the battery pack is sensed. This prevents the electronic device from being activated with a battery pack which is determined to have a fault and whose safety is not confirmed, thereby also ensuring the safety of the electronic device.

Furthermore, the electronic device may further include display means for displaying notice-image data that gives notice related with the battery pack if the battery pack is determined to have the fault by the determining means. Accordingly, a display screen of a notebook computer, for example, may automatically display characters or an image in order to inform the user of the content of the fault in the battery pack in an easy-to-understand manner. Moreover, by turning on a typical LED, for example, the user is able to know the abnormal condition in real time and in an accurate fashion.

Moreover, the notice-image data to be displayed may include measures to be taken to deal with the problem so that the user can take such suitable measures without trouble. If the electronic device is not activated yet, for example, the electronic device may be activated to display such notice-image data.

Furthermore, the notice-image data preferably informs that the battery pack is unusable. Accordingly, this prevents the user from having trouble grasping the situation, and thus prevents the user from thinking that there is a malfunction in other parts of the device.

Furthermore, the notice-image data preferably includes an advice for switching the electronic device to the sleep mode. Accordingly, since the user is able to know the suitable measures to be taken, the user can operate the electronic device safely without trouble.

Furthermore, the notice-image data may further include a button for switching the electronic device to the sleep mode. In this case, the electronic device may further include third restricting means for setting the electronic device to the sleep mode when the button is pressed. Accordingly, this saves time and trouble for the user to securely save the data or program since the user can simply follow the instructions automatically displayed on a screen and then press the button displayed on the same screen in order to shut off the power in a secure fashion. This allows the user to replace the battery pack, which is determined to have a fault, with a new one, and thus contributes to a user-friendliness of the electronic device.

Furthermore, the notice-image data is preferably displayed on a pop-up window. Accordingly, since the window automatically displays the fault in the battery pack and the suitable measures to be taken, the user is able to know the content of the fault and the measures quickly. This prevents a problem where the battery pack with the fault is used continuously onward.

Furthermore, the data related with the state of the installed battery pack preferably includes predetermined specification data and predetermined feature data of the battery pack. The term "predetermined specification data" refers to, for example, manufacture data of the battery pack. On the other hand, the term "predetermined feature data" refers to, for example, a feature for counting the total number of previous recharging operations performed on the battery pack, a feature for calculating the total hours the battery pack is used, and a feature for storing such information. Accordingly, the electronic device is capable of obtaining data used for determining whether or not the battery pack is one which is not appropriate for the electronic device (i.e. whether or not the battery pack is one whose safety is not confirmed).

Furthermore, the determining means preferably determines whether or not the predetermined specification data and the predetermined feature data are obtained. Accordingly, it can be determined whether the battery pack has the predetermined specification data and the predetermined feature data. For example, if a battery pack that is not appropriate for the electronic device (i.e. a battery pack whose safety is not confirmed) is installed, a recharging operation or activation, for example, is prevented from being performed.

Furthermore, the data related with the state of the installed battery pack may further include predetermined safety data of the battery pack. The term "predetermined safety data" refers to, for example, data that can be obtained based on specifications and features provided in the battery pack or data related with the connection state of the battery pack. Consequently, such obtained data can be used for determining whether the battery pack, for example, is at the end of its battery life, has a connection failure, and/or has a control failure.

Furthermore, the determining means preferably determines whether the battery pack is in at least in one of states where the battery pack is at an end of its battery life, where the battery pack has a connection failure, and where the battery pack has a control failure. Accordingly, if the installed battery pack is at the end of its battery life, an unnecessary recharging operation is prevented from being performed on the battery pack. This prevents the recharging operation from being performed continuously while the user does not notice such an abnormal state. Alternatively, the recharging operation may be restricted prior to the end of the battery life.

An electronic device according to another embodiment of the present invention includes a battery-pack installing portion that holds a battery pack in a detachable manner; sensing means for sensing that a battery pack is installed in the battery-pack installing portion; detecting means for detecting data related with a state of the installed battery pack sensed by the sensing means; determining means for determining whether the battery pack has a fault based on the detected data; and display means for displaying notice-image data that gives notice related with the battery pack if the battery pack is determined to have the fault by the determining means.

According to this embodiment of the present invention, when it is determined, for example, that the installed battery pack has a fault, such as being at the end of its battery life, a display screen of a notebook computer, for example, may automatically display characters or an image in order to inform a user of the content of the fault in an easy-to-understand manner. Moreover, by turning on a typical LED, for example, the user is able to know the abnormal condition in real time and in an accurate fashion.

A battery pack according to another embodiment of the present invention includes a secondary battery that is capable of supplying an electronic device with power; recording means for storing at least predetermined specification data and predetermined feature data of the secondary battery; and data output means for outputting the predetermined specification data, the predetermined feature data, and safety data determined based on the specification data and the feature data to the electronic device when a command is received from the electronic device, the predetermined specification data, the predetermined feature data, and the safety data being used as a basis for determining whether the battery pack has a fault by the electronic device.

According to this embodiment of the present invention, when the battery pack is installed, it can be easily determined by the electronic device whether the battery pack has a fault. Moreover, based on the determination, an undesirable recharging operation, for example, can be prevented.

Furthermore, the fault in the battery pack preferably corresponds to at least one of states where the battery pack is at an end of its battery life, where the battery pack has a connection failure, and where the battery pack has a control failure. Accordingly, the recharging operation may be stopped and the notice-image data may be displayed, for example, not only when the battery pack is at the end of its battery life, but also when the battery pack has, for example, a connection failure.

A power-supply controlling method for an electronic device according to another embodiment of the present invention includes the steps of sensing that a battery pack is installed in a battery-pack installing portion holding the battery pack in a detachable manner; detecting data related with a state of the installed battery pack sensed in the sensing step; determining whether the battery pack has a fault based on the detected data; and restricting a recharging operation of the battery pack if the battery pack is determined to have the fault in the determining step.

According to this embodiment of the present invention, when it is determined that the battery pack installed in the electronic device has a fault, such as being at the end of its battery life, the recharging operation of the battery pack, for example, is stopped instantly such that an undesirable recharging operation of the battery pack is prevented automatically.

Furthermore, the power-supply controlling method may further include the step of displaying notice-image data that gives notice related with the battery pack if the battery pack is determined to have the fault by the determining means. Consequently, a display screen of a notebook computer, for example, may automatically display characters or an image in order to inform a user of the content of the fault in an easy-to-understand manner. Moreover, by turning on a typical LED, for example, the user is able to know the abnormal condition in real time and in an accurate fashion.

A program according to another embodiment of the present invention allows a computer to perform the steps of sensing that a battery pack is installed in a battery-pack installing portion holding the battery pack in a detachable manner; detecting data related with a state of the installed battery pack sensed in the sensing step; determining whether the battery pack has a fault based on the detected data; and restricting a recharging operation of the battery pack if the battery pack is determined to have the fault in the determining step.

According to this embodiment of the present invention, when it is determined that the installed battery pack has a fault, such as being at the end of its battery life, the recharging operation of the battery pack, for example, is stopped instantly such that an undesirable recharging operation of the battery pack is prevented automatically.

According to the embodiments of the present invention, a user is readily informed of information related with a fault in a battery pack, such as being at the end of its battery life or having other failures, and moreover, an undesirable recharging operation or undesirable activation, for example, can be readily restricted.

DESCRIPTION OF THE PREFERRED EMBODIMENTS

Embodiments of the present invention will now be described with reference to the drawings. Although a notebook computer is mainly referred to as an example of an electronic device in the description of the embodiments below, an electronic device is not limited to a notebook computer. For example, an electronic device may alternatively include a mobile phone or a PDA (personal digital assistant).

Figure 1:
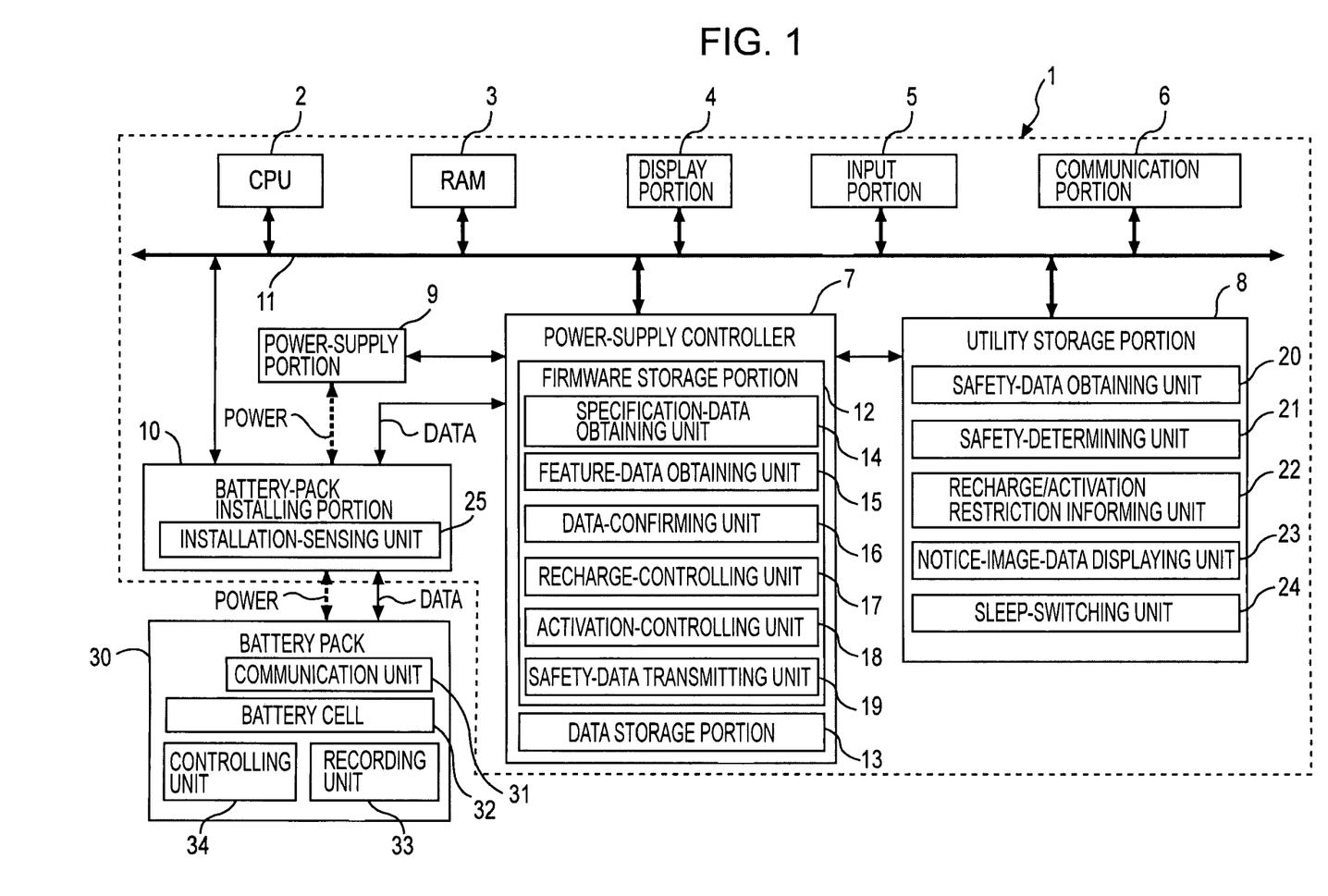
FIG. 1 is a block diagram illustrating a notebook computer according to an embodiment of the present invention and a battery pack according to an embodiment of the present invention.

FIG. 1 is a block diagram illustrating a notebook computer and a battery pack according to an embodiment of the present invention.

(Electronic Device)

Referring to FIG. 1, a notebook computer 1 includes, for example, a CPU (central processing unit) 2, a RAM (random access memory) 3, a display portion 4, an input portion 5, a communication portion 6, a power-supply controller 7, a utility storage portion 8, a power-supply portion 9, and a battery-pack installing portion 10, which are connected to one another via, for example, a bus 11.

The CPU 2 controls the exchanging of data between the above portions via the bus 11. Moreover, the CPU 2 loads a necessary program or data into the RAM 3 defining, for example, a main memory from, for example, a firmware storage portion or the utility storage portion 8, and controls the notebook computer 1 based on the program or processes each type of data. The firmware storage portion will be described later in detail.

The RAM 3 may be, for example, a high-speed readable/writable memory such as a DRAM (dynamic random access memory).

Under the control of the CPU 2, the display portion 4 is capable of displaying, for example, image data or character data. The display portion 4 may be, for example, an LCD (liquid crystal display) of a TFT (thin film transistor) or a CRT (cathode ray tube). As will be described later, the display portion 4 is capable of displaying, for example, a pop-up window to promptly show a user the condition of the battery pack.

On the other hand, the input portion 5 may include, for example, a power button, a keyboard, and a mouse, which are not shown in the drawings. By pressing the power button, the notebook computer 1 is activated, and moreover, by using, for example, the keyboard and the mouse, a log-in operation or a predetermined application can be selected and/or performed.

Under the control of the CPU 2, the communication portion 6 is capable of exchanging various types of data with the battery pack via the battery-pack installing portion 10. The exchangeable data is not limited to data from the battery pack, and may alternatively include, for example, data received from the Web via, for example, the Internet.

On the other hand, under the control of the CPU 2, the power-supply controller 7 controls the power supplied to the notebook computer 1. The power-supply controller 7 is provided with, for example, a firmware storage portion 12 and a data storage portion 13. The firmware storage portion 12 stores firmware related with, for example, a power-input standby mode, an activation mode, a battery-pack recharging mode, and data confirmation. In detail, the firmware storage portion 12 includes, for example, a specification-data obtaining unit 14, a feature-data obtaining unit 15, a data-confirming unit 16, a recharge-controlling unit 17, an activation-controlling unit 18, and a safety-data transmitting unit 19.

The specification-data obtaining unit 14 is capable of requesting the battery pack to send specification data to the notebook computer 1 via, for example, the communication portion 6 and the battery-pack installing portion 10, and then transmitting the received specification data to the data-confirming unit 16. The specification data may include, for example, information related with the manufacturer, the date of manufacture, and the capacity of the battery cell.

When the data-confirming unit 16 confirms that the received specification data corresponds to preliminarily-stored specification data, the feature-data obtaining unit 15 may request the battery pack to send feature data to the notebook computer 1 via the communication portion 6 and the battery-pack installing portion 10 in the same manner as the specification data. The feature-data obtaining unit 15 then transmits the received feature data to the data-confirming unit 16. The feature data may include, for example, information of the battery pack related with a feature for determining the degradation level of the battery cell, a feature for calculating the total hours the battery pack is used, a feature for setting a battery mode (for example, a feature for recording information that the notebook computer operates in a power-saving mode when the installed battery is being used), and a feature for counting the total number of previous recharging operations.

The data-confirming unit 16 is capable of determining whether the corresponding types of data obtained by, for example, the specification-data obtaining unit 14 and the feature-data obtaining unit 15 respectively correspond to the specification data and the feature data preliminarily stored in the data storage portion 13. Consequently, the installed battery pack can be determined whether or not it meets the predetermined specification data and feature data, whereby the safety of using that battery pack can be confirmed.

The recharge-controlling unit 17 allows the power-supply portion 9 to supply the battery pack with predetermined power via the battery-pack installing portion 10 so that a recharging operation can be performed.

On the other hand, if the data-confirming unit 16 sends data to the recharge-controlling unit 17 indicating that the specification data and the feature data of the installed battery pack do not correspond to the predetermined specification data and feature data, the recharge-controlling unit 17, for example, commands the power-supply portion 9 to stop supplying power to the battery pack.

Accordingly, this prevents a recharging operation from being performed on a battery pack whose safety is not confirmed due to not meeting the predetermined specification data and feature data, thereby achieving better safety and lower power consumption.

Furthermore, the activation-controlling unit 18 controls the activation of the notebook computer 1. If the data-confirming unit 16 sends data to the activation-controlling unit 18 indicating that the specification data and the feature data of the installed battery pack do not correspond to the predetermined specification data and feature data during a power-input standby mode, the activation-controlling unit 18 can prevent the notebook computer 1 from being activated. Accordingly, this prevents the notebook computer 1 from receiving power from a battery pack whose safety is not confirmed, thereby preventing the safety of the notebook computer 1 from being put at risk.

During the activation of the notebook computer 1, if the safety-data transmitting unit 19, for example, receives a message from a safety-data obtaining unit in the utility storage portion 8 indicating a request for safety data, the safety-data transmitting unit 19 sends that request to the battery pack via serial communication through the communication portion 6 and the battery-pack installing portion 10. The safety-data obtaining unit will be described later in detail. Furthermore, in response to the request, the battery pack sends safety data to the safety-data transmitting unit 19 via the battery-pack installing portion 10 and the communication portion 6. Then, the safety-data transmitting unit 19 transmits the safety data to a safety-determining unit contained in the utility storage portion 8. Accordingly, this allows a utility program to determine the safety of the battery back.

On the other hand, the data storage portion 13 preliminarily stores data related with, for example, specifications and features of battery packs that are acceptable by the notebook computer 1. Where necessary, the specification data and feature data can be taken out.

The utility storage portion 8 stores utility programs for safety determination during activation; for informing of the restriction of recharging and/or activation; for displaying notice-image data; and for switching to a sleep mode. In detail, the utility storage portion 8 contains, for example, a safety-data obtaining unit 20, a safety-determining unit 21, a recharge/activation restriction informing unit 22, a notice-image-data displaying unit 23, and a sleep-switching unit 24.

For example, when it is confirmed that the specification data and the feature data of the battery pack respectively correspond to the preliminarily-stored specification data and feature data, and the notebook computer 1 is thus activated and is logged in, the safety-data obtaining unit 20 may send a message to the safety-data transmitting unit 19 of the firmware to request safety data.

On the other hand, the safety-determining unit 21, for example, receives the result of the safety data from the battery pack via the safety-data transmitting unit 19 of the firmware so as to determine the safety. For example, a safety confirmation command is sent to the battery pack via serial communication, and the safety-determining unit 21 defining one of the utility programs then receives an information value that corresponds to a result of the safety confirmation command from the safety-data transmitting unit 19 of the firmware. Based on the value, the safety-determining unit 21 determines whether the safety is ensured.

The safety data includes, for example, information related with the number of previous recharging operations performed on the battery pack, information indicating whether the degradation rate is equal to or lower than a certain value, and information indicating whether a connection or a control circuit in the battery pack is properly functioning. If it is determined that the safety data of the battery pack could not be confirmed, it is determined that the battery pack is at the end of its battery life or that the connection or the control circuit is impaired.

Here, an end of its battery life refers to a state in which the battery cannot maintain its original properties due to, for example, repeating of recharging and discharging operations or degradation caused in the period of storage. On the other hand, the term "impaired" refers to a state in which the transmission and the recharging/discharging operations are not properly performed due to, for example, a failure in the control circuit in the battery pack. Specifically, if the remaining battery level only reaches about 30% of the initial level even after a full recharging operation, it is considered that the battery is at the end of its battery life.

When the recharge/activation restriction informing unit 22 receives, for example, a determination result from the safety-determining unit 21 indicating that the safety of the battery pack could not be confirmed, the recharge/activation restriction informing unit 22 sends a command to the recharge-controlling unit 17 of the firmware so that the recharge-controlling unit 17 in the power-supply controller 7 stops the power-supply portion 9 from supplying the battery pack with power. Moreover, when the notebook computer 1 is shut down or is switched to a sleep mode by, for example, the activation-controlling unit 18, the recharge/activation restriction informing unit 22 sends a command to the activation-controlling unit 18 of the firmware to prevent the notebook computer 1 from being activated unless the battery pack whose safety is not confirmed is removed.

When the notice-image-data displaying unit 23 receives, for example, a determination result from the safety-determining unit 21 indicating that the safety of the battery pack could not be confirmed, the notice-image-data displaying unit 23 commands the display portion 4 to display, for example, a pop-up window with, for example, characters or an image to inform that the installed battery pack has a fault and to give an advice that the battery pack should be replaced with a new one. In that case, the cause of such a fault and the measures against such a fault may also be displayed so as to let the user know how to handle the situation.

When the sleep-switching unit 24 receives, for example, data indicating that an OK button for switching to a sleep mode provided on the pop-up window displayed by the notice-image-data displaying unit 23 is pressed, the sleep-switching unit 24 commands the power-supply controller 7 to switch the notebook computer 1 to a sleep mode.

Under the control of the power-supply controller 7, the power-supply portion 9 supplies the battery-pack installing portion 10 with charging power, and supplies each component of the notebook computer 1 with power from an AC power supply. Moreover, when the battery pack is installed, the power-supply portion 9 supplies each component of the notebook computer 1 with power received from the battery pack when necessary. Furthermore, based on a command from the power-supply controller 7, the power-supply portion 9 is also capable of stopping the recharging operation and restricting the activation of the notebook computer 1.

The battery-pack installing portion 10 is provided with an installation-sensing unit 25 that senses the installed battery pack; a terminal used for recharging and discharging of power; and a terminal for exchanging data with the battery pack. These terminals are not shown in the drawings. The battery-pack installing portion 10 is capable of exchanging, for example, power with the power-supply portion 9 and exchanging, for example, various types of data with the power-supply controller 7.

The installation-sensing unit 25, for example, electrically or physically senses that the set of recharge/discharge terminal and the data terminal and a set of corresponding terminals of the battery pack are in contact with each other. When the installed battery pack is sensed by the installation-sensing unit 25, the corresponding data indicating the installation is sent to the power-supply portion 9 and the power-supply controller 7 so as to allow the specification-data obtaining unit 14 of the firmware, for example, to obtain the corresponding specification data.

(Battery Pack)

A battery pack 30 shown in FIG. 1 includes, for example, a communication unit 31, a battery cell 32, a recording unit 33, and a controlling unit 34 such as a CPU or a ROM. Although not shown in the drawings, the battery pack 30 is further provided with terminals respectively corresponding to the recharge/discharge terminal and the data terminal of the battery-pack installing portion 10.

The communication unit 31 is, for example, for sending data recorded in the recording unit 33 and read by the controlling unit 34. Such data includes, for example, the specification data and the feature data of the battery pack 30 or the safety data to be sent to the power-supply controller 7 and read by the controlling unit 34. Moreover, the communication unit 31 also transmits data related with, for example, a command from the power-supply controller 7 to the controlling unit 34.

The battery cell 32 is a secondary battery subject to recharging/discharging operations, and may be, for example, a non-aqueous electrolyte battery such as a lithium-ion secondary battery.

The controlling unit 34 is provided with, for example, a CPU, a ROM, and a RAM, which are not shown in the drawings, and controls the exchanging of the various types of data. Moreover, the controlling unit 34 also controls the battery pack 30 and processes each type of data.

Such various types of data are stored in the recording unit 33, and moreover, new data can be recorded onto the recording unit 33 via the controlling unit 34. The data includes, for example, the specification data and the feature data of the battery pack 30.

(Power-Supply Controlling Method for Electronic Device)

A power-supply controlling method for the notebook computer 1, which is an example of an electronic device, will now be described.

Figure 2:
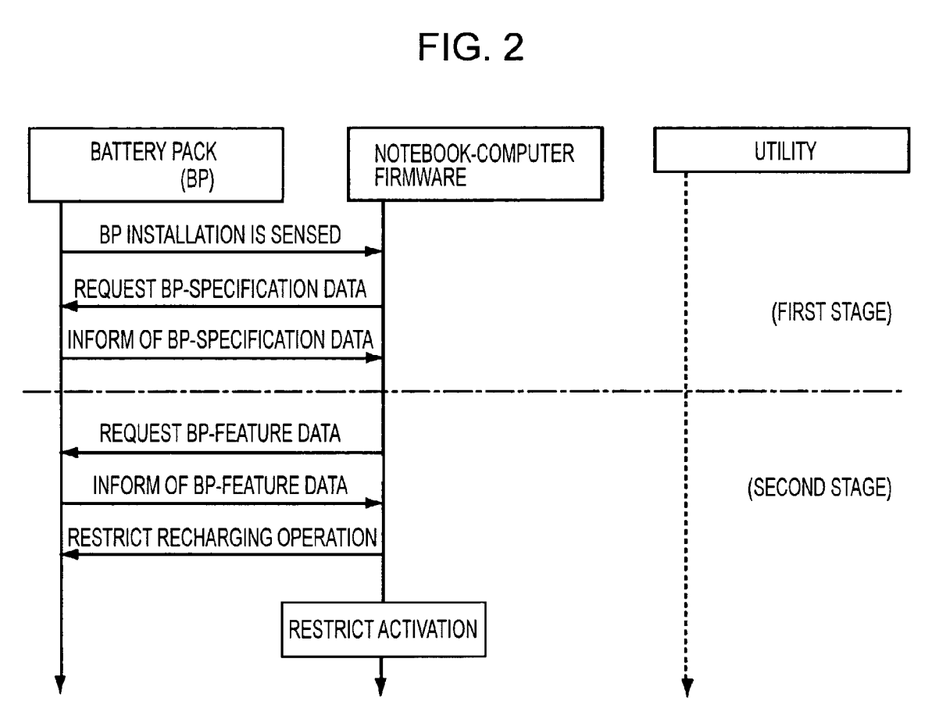
FIG. 2 is a sequence diagram of the notebook computer before activation and the battery pack.
Figure 3:
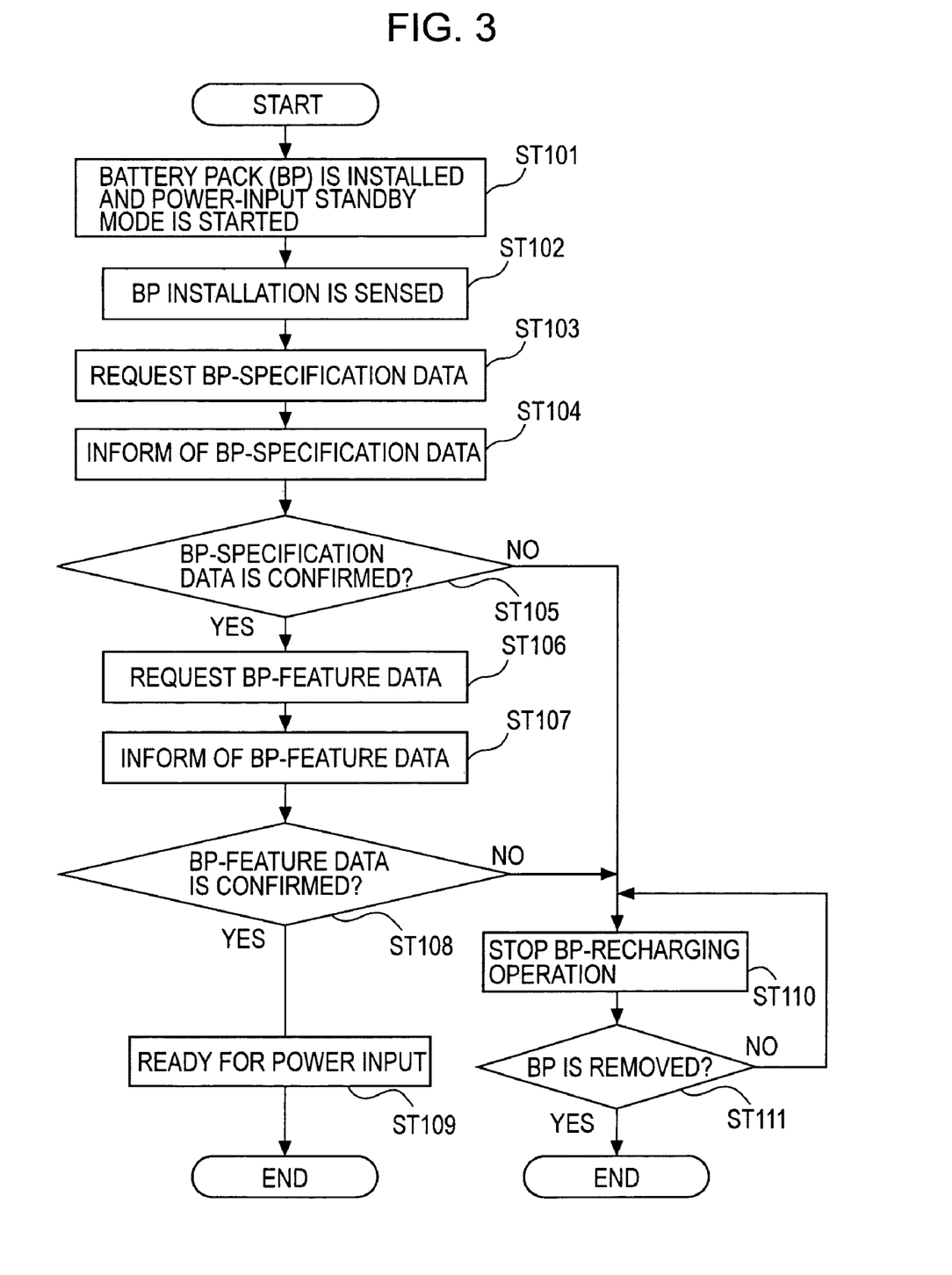
FIG. 3 is a flow chart illustrating a power-supply controlling method for the notebook computer before activation.

FIG. 2 is a sequence diagram of the notebook computer 1 before activation and the battery pack 30. FIG. 3 is a flow chart illustrating the power-supply controlling method for the notebook computer 1 before activation.

The following is a brief description of the power-supply controlling method for the notebook computer 1.

The power-supply controlling method for the notebook computer 1 includes four main stages. Specifically, the method mainly includes a first stage in which, for example, the specification data of the battery pack 30 is confirmed; a second stage in which, for example, the feature data of the battery pack 30 is confirmed; and a third stage in which, for example, the safety of the battery pack 30 is determined (confirmed). Such safety determination includes a final confirmation of the safety confirmed in the first and second stages. Furthermore, the method further includes a fourth stage in which, for example, when it is sensed that the battery pack 30 is installed during an activated state, a corresponding process of the battery pack 30 is performed in response to the determination results (confirmation results) from the first, second and third stages.

The power-supply controlling method for the notebook computer 1 before activation in the first and second stages will now be described in detail.

Referring to FIGS. 1 and 3, in step ST101 of the first stage, the battery pack 30 is installed in the battery-pack installing portion 10, and the power-supply controller 7, for example, controls the power-supply portion 9 such that the notebook computer 1 begins to operate in a power-input standby mode.

In step ST102, when the installation-sensing unit 25 in the battery-pack installing portion 10 senses that the set of the recharge/discharge terminal and the data terminal of the battery pack 30 (reference character BP in the drawings is an abbreviation of "battery pack") and the corresponding set of a recharge/discharge terminal and a data terminal of the battery-pack installing portion 10 are properly connected with each other, the installation-sensing unit 25 sends data to the specification-data obtaining unit 14 of the firmware in the notebook computer 1 indicating that the battery pack 30 is installed, as shown in FIG. 2.

In step ST103, after receiving the installation data of the battery pack 30, the specification-data obtaining unit 14 sends a specification-data confirmation command to the communication unit 31 in the battery pack 30 through the communication portion 6 and the battery-pack installing portion 10 via, for example, serial communication.

The communication unit 31 in the battery pack 30 then passes the received command onto the controlling unit 34. Subsequently, the controlling unit 34 reads the specification data of the battery pack 30 recorded in the recording unit 33, and commands the communication unit 31 to send the specification data to the specification-data obtaining unit 14 of the firmware. As a result, in step ST104, the specification-data obtaining unit 14 receives the specification data of the battery pack 30.

After receiving the specification data of the battery pack 30, the specification-data obtaining unit 14 sends the data to the data-confirming unit 16. In step ST105, after receiving the data, the data-confirming unit 16 reads corresponding specification data from the data storage portion 13 and determines whether the two specification data items correspond to each other.

Referring to FIGS. 2 and 3, if it is confirmed that the two specification data items correspond to each other, the operation proceeds onto the second stage. Subsequently, in step ST106, the data-confirming unit 16 informs the feature-data obtaining unit 15 that the specification data of the battery pack 30 is confirmed, and the feature-data obtaining unit 15 sends a feature-data confirmation command to the communication unit 31 in the battery pack 30 via the communication portion 6 and the battery-pack installing portion 10 so as to request the feature data.

The communication unit 31 in the battery pack 30 passes the received command onto the controlling unit 34. Subsequently, the controlling unit 34 reads the feature data of the battery pack 30 recorded in the recording unit 33, and commands the communication unit 31 to send the feature data to the feature-data obtaining unit 15 of the firmware. As a result, in step ST107, the feature-data obtaining unit 15 receives the feature data of the battery pack 30.

After receiving the feature data of the battery pack 30, the feature-data obtaining unit 15 sends the data to the data-confirming unit 16. In step ST108, after receiving the data, the data-confirming unit 16 reads corresponding feature data from the data storage portion 13 and determines whether the two feature data items correspond to each other.

Referring to FIGS. 2 and 3, if it is confirmed that the two feature data items correspond to each other, the data-confirming unit 16 informs the activation-controlling unit 18 that the feature data is confirmed. Consequently, in step ST109, the activation-controlling unit 18 commands the power-supply portion 9 to prepare for power input. Accordingly, this allows for power input after the first and second stages in which the confirmation of both the specification data and the feature data is completed so that the notebook computer 1 can be activated.

On the other hand, referring to FIG. 3, if it is determined in each of step ST105 and step ST108 that the data items do not correspond to each other, data indicating that the data items did not correspond to each other is sent to the recharge-controlling unit 17. The recharge-controlling unit 17 then commands the power-supply portion 9 to stop recharging the battery pack 30. Thus, in step ST110, the power-supply portion 9 stops the recharging of the battery pack 30 via the battery-pack installing portion 10. Accordingly, this prevents power from being supplied to a battery pack whose correspondence with the predetermined specification data and feature data is not confirmed, whereby a waste of power supply is prevented. As a result, this contributes to better safety and lower power consumption.

Furthermore, the recharge-controlling unit 17 commands the installation-sensing unit 25 in the battery-pack installing portion 10 to send installation data of the battery pack 30. The installation-sensing unit 25 senses whether or not the battery pack 30 is installed, and informs the recharge-controlling unit 17 of whether the installation is sensed. In step ST111, based on the installation data, the recharge-controlling unit 17 determines whether the battery pack 30 is removed. If it is determined that the battery pack 30 is removed, the power-supply control operation of the notebook computer 1 is finished. In contrast, if it is determined that the battery pack 30 is not removed in step ST111, the operation returns to step ST110.

Accordingly, this means that the power input for the notebook computer 1 is not allowed until the battery pack whose correspondence with the predetermined specification data and feature data is not confirmed is removed. As a result, the use of the battery cell of such a battery pack can be prevented.

The power-supply controlling method for the notebook computer 1 before activation has just been described above.

The power-supply controlling method for the notebook computer 1 after activation will now be described.

Figure 4:
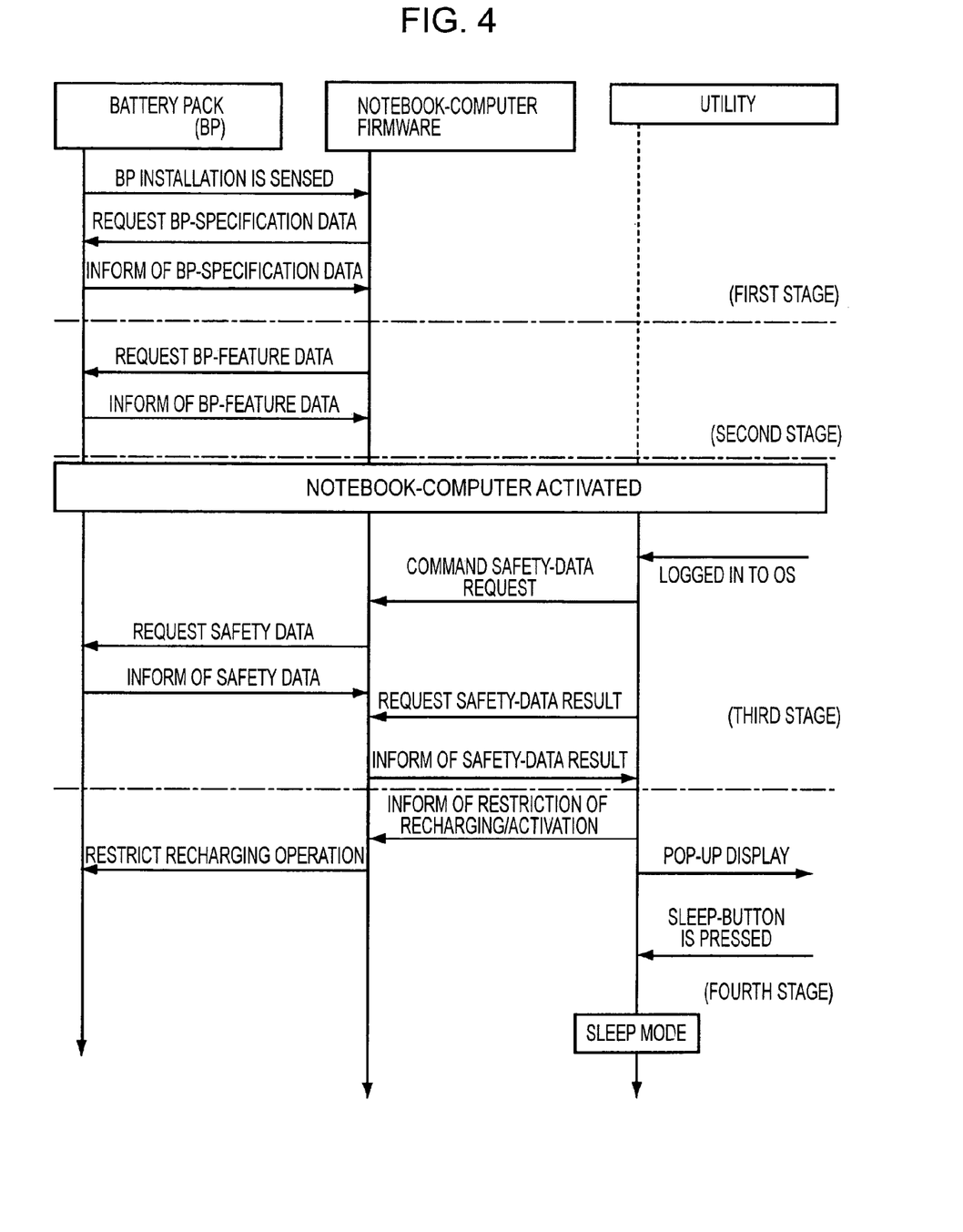
FIG. 4 is a sequence diagram of the notebook computer and the battery pack in which a process after the activation of the notebook computer is included.
Figure 5:
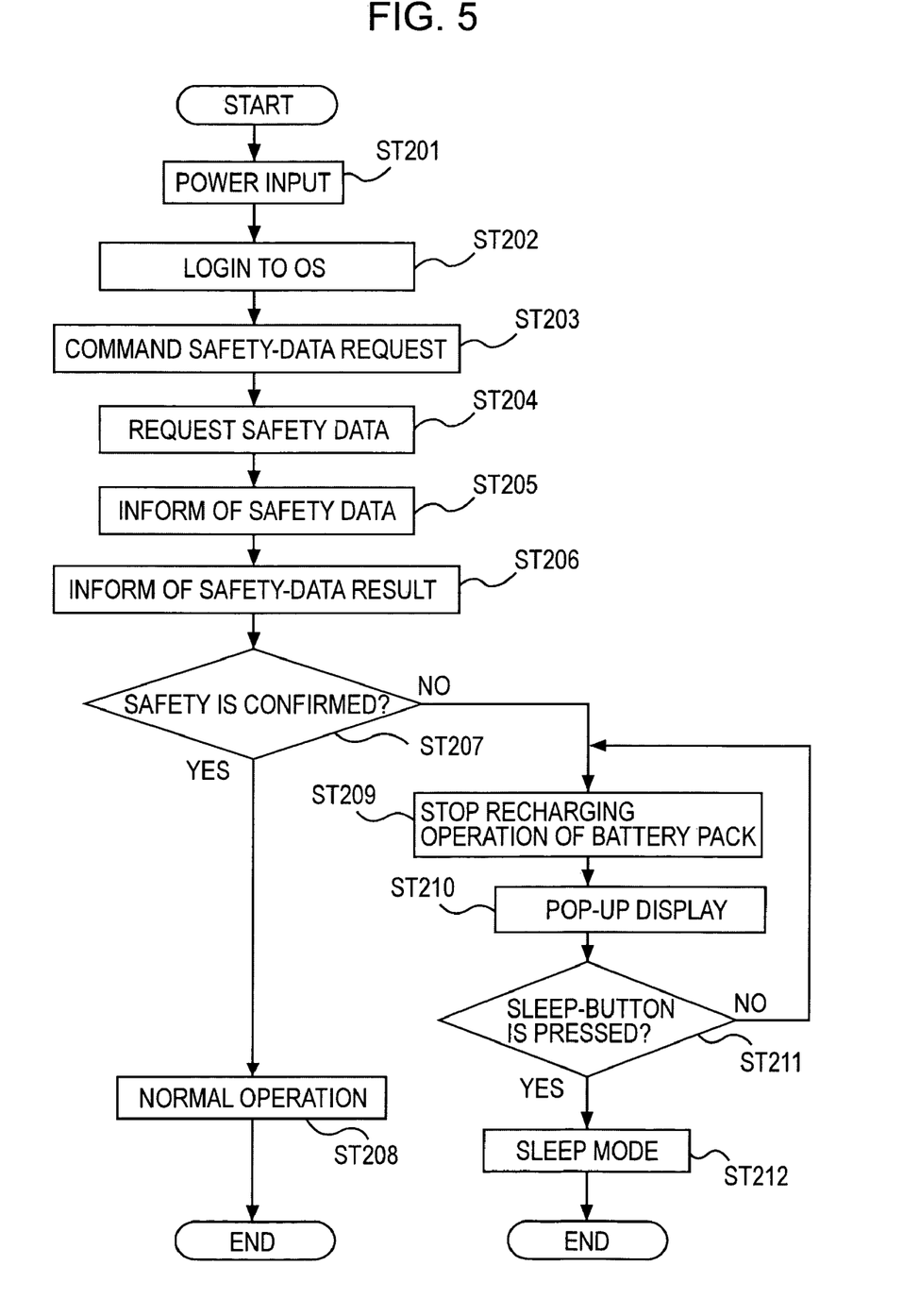
FIG. 5 is a flow chart illustrating the power-supply controlling method for the notebook computer after activation.
Figure 6:
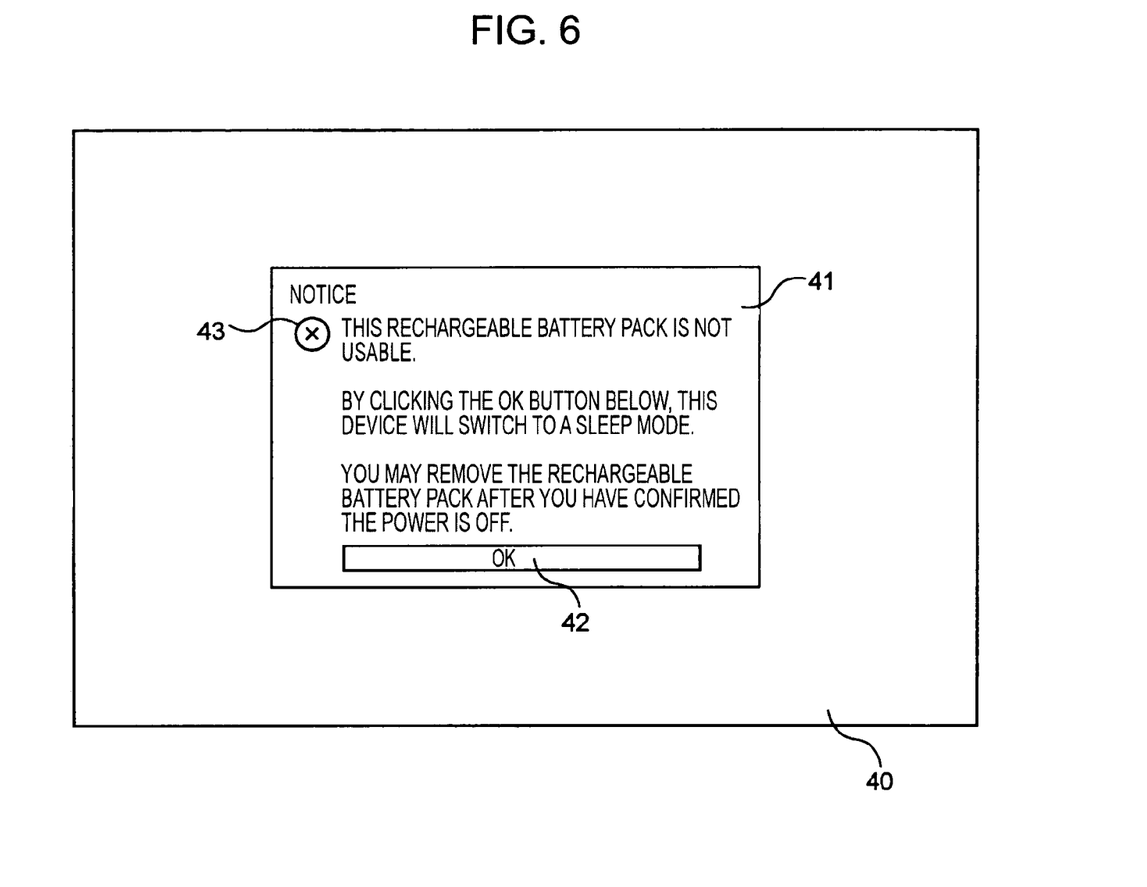
FIG. 6 is a schematic view of a pop-up window.

FIG. 4 is a sequence diagram of the notebook computer 1 and the battery pack 30 in which the process after the activation of the notebook computer 1 is included. FIG. 5 is a flow chart illustrating the power-supply controlling method for the notebook computer 1 after activation. FIG. 6 is a schematic view of a pop-up window.

Referring to FIGS. 3 and 4, when the confirmation of both the specification data and the feature data of the battery pack 30 is obtained in the first and second stages, the notebook computer 1 is put on standby for power input in step ST109. The operation then proceeds to the third stage.

In detail, referring to FIGS. 4 and 5, power is input to the notebook computer 1 in step ST201 of the third stage. Subsequently, when a login to an OS (operating system) is detected in step ST202, the safety-data obtaining unit 20 contained in the utility storage portion 8 commands the safety-data transmitting unit 19 of the firmware to send a message to the battery pack 30 through the communication portion 6 and the battery-pack installing portion 10 via serial communication in step ST203. In this case, the message is a request for safety data.

Here, the term "when a login to an OS is detected" refers to, for example, a state where the OS and a utility program are activated, or a state where a utility program detects that the OS is switched back from a standby mode, or a state where a utility program detects that the OS is switched back from a sleep mode.

Subsequently, in step ST204, the safety-data transmitting unit 19 in the power-supply controller 7 sends the message to the battery pack 30 via the communication portion 6 and the battery-pack installing portion 10 so as to request the safety data. Then, the communication unit 31 in the battery pack 30 receiving the message passes the message onto the controlling unit 34.

The controlling unit 34 reads the feature data and other data stored in the recording unit 33, and moreover, obtains necessary data from, for example, the battery cell 32. Thus, in step ST205, the safety data is sent from the communication unit 31 to the safety-data transmitting unit 19 in the power-supply controller 7 via the battery-pack installing portion 10 and the communication portion 6. In this case, the safety data includes information related with, for example, the number of previous recharging operations, the degradation level, and the temperature of the battery cell 32.

On the other hand, the safety-data obtaining unit 20 defining a utility program requests the safety-data transmitting unit 19 to send over the result of the safety data. In step ST206, in response to the request, the safety-data transmitting unit 19 sends the result of the safety data to the safety-data obtaining unit 20. After obtaining the result of the safety data, the safety-data obtaining unit 20 passes the result of the safety data onto the safety-determining unit 21. In step ST207, the safety-determining unit 21 determines whether the safety is ensured.

For example, based on a message from the battery pack 30, the safety-determining unit 21 reads an information result of a safety confirmation command. The safety-determining unit 21 then determines whether the information result is a normal value. Based on the value, the safety-determining unit 21 determines whether the safety is ensured. This is the end of the third stage, and the operation from this point onward will be the fourth stage in which the contents determined in the first to third stages will be processed.

For example, referring to FIGS. 4 and 5, when it is determined that the safety is ensured in step ST207, the safety-determining unit 21 defining one of the utility programs allows the OS to operate in the ongoing operational mode in step ST208 (normal operation).

In contrast, when the safety-determining unit 21 determines that the safety is not confirmed in step ST207, the safety-determining unit 21 passes the determination data to the recharge/activation restriction informing unit 22. After receiving such determination data indicating that the safety is not confirmed, the recharge/activation restriction informing unit 22 informs the recharge-controlling unit 17 of the firmware of the need to restrict the recharging operation. Moreover, if, for example, the notebook computer 1 is switched to a sleep mode or is shut down, the recharge/activation restriction informing unit 22 informs the activation-controlling unit 18 of the need to restrict the activation of the notebook computer 1.

Accordingly, in step ST209, the recharge-controlling unit 17 of the firmware commands the power-supply portion 9 to stop recharging the battery pack 30.

Furthermore, in a case where the safety-determining unit 21 determines that the safety is not confirmed in step ST207, the safety-determining unit 21 passes the determination data to the notice-image-data displaying unit 23. In step ST210, after receiving such determination data, the notice-image-data displaying unit 23 commands the display portion 4 to display, for example, a pop-up window 41 on a display screen 40 of the notebook computer 1 as shown in FIG. 6. The pop-up window 41 gives a notice describing the fault in the battery pack 30 in an easy-to-understand manner using characters or an image. The content to be displayed on the pop-up window 41 may be any kind of a notice describing the fault in the battery pack 30, such as a content informing the user of the need for replacing the battery pack 30 with a new one for the reason that the battery pack 30, for example, is at the end of its battery life or has an impaired control circuit. For example, the content may be a description of a fault in a rechargeable battery pack.

Furthermore, in step ST211, the sleep-switching unit 24 determines whether or not an OK button 42, which is shown in FIG. 6 and defines a sleep-switching button, is pressed. In step ST212, if the sleep-switching unit 24 confirms that the OK button 42 is pressed, the sleep-switching unit 24, for example, commands the power-supply controller 7 to switch the notebook computer 1 to a sleep mode.

In contrast, if the sleep-switching unit 24 determines that the OK button 42 is not pressed in step ST211, the operation returns to step ST209. Consequently, this allows the user to know instantly that there is a fault in the battery pack so as to allow the user to smoothly solve the problem.

Furthermore, in view of protecting data, even when the pop-up window 41 is being displayed, a regular operation may be performed with the exception of the recharging operation for the battery pack 30. Moreover, referring to FIG. 6, a close button 43, for example, may be provided. Specifically, the pop-up window 41 closes when this close button 43 is pressed, but may be set such that the pop-up window 41 pops up again after a predetermined time.

The power-supply controlling method for the notebook computer 1 after activation has just been described above.

The power-supply controlling method for the notebook computer 1 in a case where a new battery pack 30 is installed in the battery-pack installing portion 10 after activation will now be described. Some parts in this method that are similar to the above-described power-supply controlling method for the notebook computer 1 after activation are given the same reference characters and numerals, and the description of those parts will be omitted to prevent redundancy.

Figure 7:
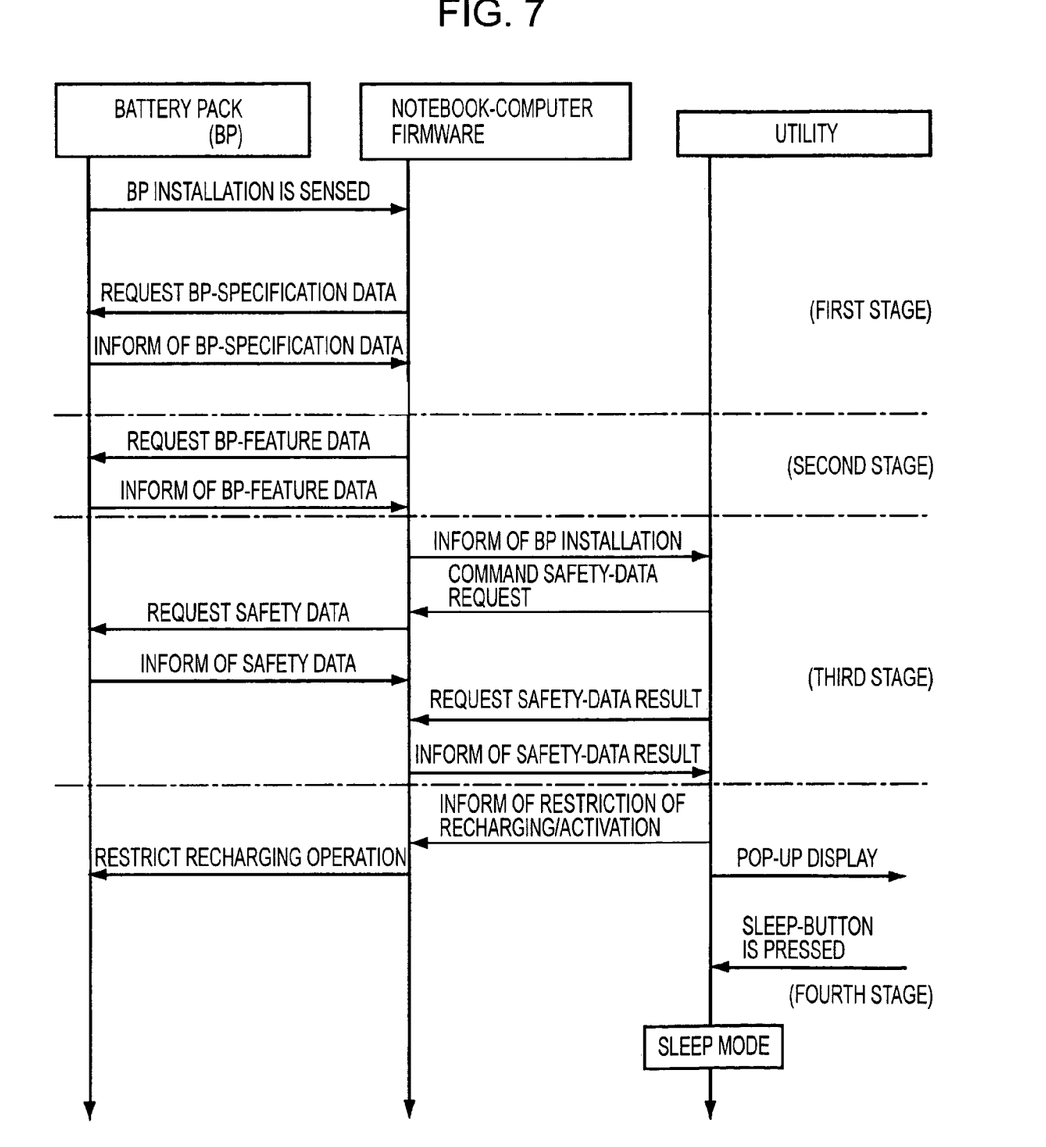
FIG. 7 is a sequence diagram of the notebook computer and the battery pack in a case where the battery pack is installed after activation.
Figure 8:
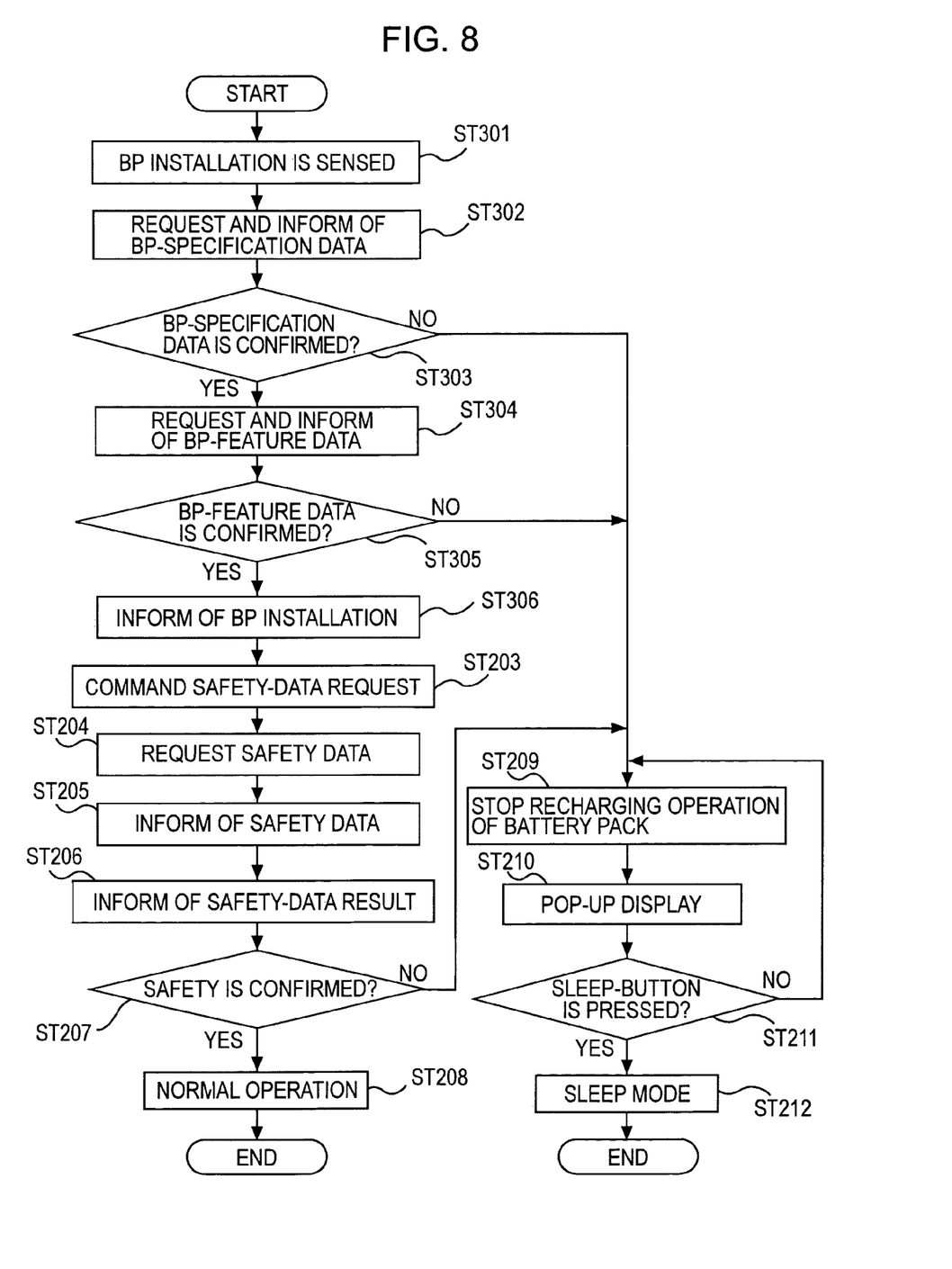
FIG. 8 is a flow chart illustrating the power-supply controlling method for the notebook computer in a case where the battery pack is installed after activation.

FIG. 7 is a sequence diagram of the notebook computer 1 and the battery pack 30 in a case where the battery pack 30 is installed after activation. FIG. 8 is a flow chart illustrating the power-supply controlling method for the notebook computer 1 in a case where the battery pack 30 is installed after activation.

Referring to FIGS. 1, 7, and 8, in step ST301 of the first stage, the battery pack 30 is installed in the battery-pack installing portion 10. When the installation-sensing unit 25 in the battery-pack installing portion 10 senses that the set of the recharge/discharge terminal and the data terminal of the battery pack 30 and the corresponding set of the recharge/discharge terminal and the data terminal of the battery-pack installing portion 10 are properly connected with each other, the installation-sensing unit 25 sends data to the specification-data obtaining unit 14 of the firmware indicating that the battery pack 30 is installed, as shown in FIG. 7.

In step ST302, after receiving the installation data of the battery pack 30, the specification-data obtaining unit 14 sends a specification-data confirmation command to the communication unit 31 in the battery pack 30. The communication unit 31 in the battery pack 30 then passes the received command onto the controlling unit 34. Subsequently, the controlling unit 34 reads the specification data of the battery pack 30 stored in the recording unit 33, and commands the communication unit 31 to send the specification data to the specification-data obtaining unit 14 of the firmware.

After receiving the specification data of the battery pack 30, the specification-data obtaining unit 14 sends the data to the data-confirming unit 16. In step ST303, the data-confirming unit 16 reads corresponding specification data from the data storage portion 13 and determines whether the two specification data items correspond to each other.

Referring to FIGS. 7 and 8, if it is confirmed that the two specification data items correspond to each other, the operation proceeds onto the second stage. In step ST304, the data-confirming unit 16 informs the feature-data obtaining unit 15 that the specification data of the battery pack 30 is confirmed, and the feature-data obtaining unit 15 sends a feature-data confirmation command to the communication unit 31 in the battery pack 30 so as to request the feature data.

The communication unit 31 in the battery pack 30 then passes the received command onto the controlling unit 34. Subsequently, the controlling unit 34 reads the feature data of the battery pack 30 stored in the recording unit 33, and commands the communication unit 31 to send the feature data to the feature-data obtaining unit 15 of the firmware.

The feature-data obtaining unit 15 receives the feature data of the battery pack 30 and sends the data to the data-confirming unit 16. In step ST305, after receiving the data, the data-confirming unit 16 reads corresponding feature data from the data storage portion 13 and determines whether the two feature data items correspond to each other.

Referring to FIGS. 7 and 8, if it is confirmed that the two specification data items of the battery pack 30 correspond to each other and the two feature data items of the battery pack 30 correspond to each other, the operation proceeds to the third stage.

In detail, referring to FIGS. 7 and 8, in step ST306 of the third stage, the data-confirming unit 16 of the firmware sends data to the safety-data obtaining unit 20 in the utility storage portion 8 indicating that the battery pack 30 is installed in the battery-pack installing portion 10.

A detailed description of the subsequent steps in the fourth stage will be omitted for the reason that these steps are the same as steps ST203 to ST212. Specifically, in these subsequent steps, the safety-data obtaining unit 20 commands the safety-data transmitting unit 19 of the firmware to send a message to the battery pack 30 through the communication portion 6 and the battery-pack installing portion 10 via serial communication in order to request safety data (step ST203); the sleep-switching unit 24 determines whether or not the OK button 42, which is shown in FIG. 6 and defines a sleep-switching button, is pressed (step ST211); and the sleep-switching unit 24, for example, commands the power-supply controller 7 to switch the notebook computer 1 to a sleep mode if the sleep-switching unit 24 confirms that the OK button 42 is pressed (step ST212).

However, as shown in FIG. 8, if the determination result obtained in each of the steps ST303, ST305, and ST207 is negative, the corresponding data indicating such negative determination result is sent to the recharge-controlling unit 17. The recharge-controlling unit 17 thus commands the power-supply portion 9 to stop recharging the battery pack 30 in step ST209.

Furthermore, if the safety-determining unit 21 receives corresponding data indicating such negative determination results obtained in steps ST303 and ST305 and thus makes a final determination that the determination results are negative, or if the safety-determining unit 21 determines that the safety is not confirmed in step ST207, the safety-determining unit 21, for example, passes the corresponding determination data to the notice-image-data displaying unit 23. Moreover, in step ST210, after receiving such determination data, the notice-image-data displaying unit 23 commands the display portion 4 to display, for example, the pop-up window 41 on the display screen 40 of the notebook computer 1 as shown in FIG. 6.

The power-supply controlling method for the notebook computer 1 in a case where a new battery pack 30 is installed after activation has just been described above.

According to the above embodiments, there is provided a detector detecting data related with a state of an installed battery pack; a determining unit determining whether the battery pack has a fault based on the detected data; and a first restricting unit restricting a recharging operation of the battery pack determined to have a fault by the determining unit. Accordingly, if it is determined that the installed battery pack has a fault due to, for example, being at the end of its battery life, the recharging operation for that battery pack is stopped instantly so that an undesirable recharging operation on that battery pack can be prevented automatically.

Specifically, there is provided the specification-data obtaining unit 14 and the feature-data obtaining unit 15 in the firmware storage portion 12; the safety-data obtaining unit 20 in the utility storage portion 8; the data-confirming unit 16 and the safety-determining unit 21 for data confirmation and determination; and the recharge-controlling unit 17 that restricts the recharging operation from being performed on the battery pack 30 determined to have a fault based on the confirmation and determination results. Consequently, if it is determined that the installed battery pack 30 has a fault due to, for example, being at the end of its battery life, the recharging operation for that battery pack 30 is stopped instantly so that an undesirable recharging operation on that battery pack 30 can be prevented automatically.

Moreover, there is further provided the activation-controlling unit 18 defining a second restricting unit restricting the activation of the notebook computer 1 when the notebook computer 1 defining the electronic device is in a non-activated state or in a sleep mode and if the removal of the battery pack 30 determined to have a fault is not sensed by the installation-sensing unit 25. If the notebook computer 1 is not activated yet, the notebook computer 1 can be prevented from being activated by the battery pack 30 determined to have a fault, thereby ensuring the safety of the notebook computer 1.

Furthermore, if the battery pack 30 is determined to have a fault during the activation of the notebook computer 1 and the notebook computer 1 is thus switched to a sleep mode, for example, the notebook computer 1 is prevented from being reactivated until the removal of the battery pack 30 is sensed. This prevents the notebook computer 1 from being activated by the battery pack 30 which is determined to have a fault and whose safety is not confirmed, thereby also ensuring the safety of the notebook computer 1.

Moreover, there is further provided the notice-image-data displaying unit 23 that displays notice-image data related with the battery pack 30 which is determined to have a fault and whose safety is not confirmed by the safety-determining unit 21. For example, the display screen 40 of the notebook computer 1 automatically displays, for example, characters or an image in order to inform the user of the content of the fault in the battery pack 30 in an easy-to-understand manner. Moreover, by turning on a typical LED, for example, the user is able to know the abnormal condition in real time and in an accurate fashion.

Furthermore, the notice-image data may also display measures to be taken to deal with the problem so that the user can take such suitable measures without trouble. If the notebook computer 1 is not activated yet, for example, the notebook computer 1 may be activated to display such notice-image data.

The notice-image data is further provided with the OK button 42 that allows the notebook computer 1 to be switched to a sleep mode. Furthermore, in the above embodiments, there is further provided the sleep-switching unit 24 that switches the notebook computer 1 to a sleep mode when the OK button 42 is pressed. Accordingly, this saves time and trouble for the user to securely save the data or program since the user can simply follow instructions automatically displayed on the display screen 40 and then press the OK button 42 displayed on the display screen 40 in order to shut off the power in a secure fashion. This allows the user to replace the battery pack 30, which is determined to have a fault and whose safety is not confirmed, with a new one, and thus contributes to a user-friendliness of the notebook computer 1.

Furthermore, when the installed battery pack is determined to have a fault in the first stage and the second stage, the display screen 40 of the notebook computer 1 instantly and automatically displays, for example, characters or an image in order to inform the user of the content of the fault in the battery pack 30 in an easy-to-understand manner. Moreover, by turning on a typical LED, for example, the user is able to know the abnormal condition in real time and in an accurate fashion.

Furthermore, there is further provided the recording unit 33 for storing predetermined specification data and feature data of the battery cell 32; and the communication unit 31 and the controlling unit 34 that receive a command from the notebook computer 1 defining an electronic device, and output the predetermined specification data and feature data to the notebook computer 1 and safety data determined based on the specification data and the feature data to the notebook computer 1 so that the notebook computer 1 can determine the fault in the battery pack 30. Accordingly, when the battery pack 30 is installed, the notebook computer 1 can readily determine the fault in the battery pack 30. Moreover, based on the determination result, an undesirable recharging operation, for example, can be prevented.

Furthermore, the fault in the battery pack 30 may include at least one of the following states: a state where the battery pack is at the end of its battery life, a state where the battery pack has a connection failure; and a state where the battery pack has a control failure. For this reason, when the battery pack 30 is used, the recharging operation is stopped not only when the battery pack 30 is at the end of its battery life but also when, for example, the connection in the battery pack 30 is impaired. In such a case, the notice-display data is displayed on the display screen 40 of the notebook computer 1.

A typical battery cell currently used in an electronic device such as a notebook computer is a nickel-metal-hydride secondary battery or a lithium-ion secondary battery. These types of batteries, however, deteriorate and lose their original properties when recharging/discharging operations are performed for several hundreds of times. Moreover, the number of recharging/discharging operations that can be performed on battery cells depends significantly on the environment in which the battery cells are used. Furthermore, it is extremely difficult to distinguish whether or not a battery cell is at the end of its battery life based on its external appearance.

On the other hand, by automatically displaying a pop-up window to inform the user of a dead (impaired) battery pack, the user is able to know quite easily that the installed battery pack is at the end of its battery life (impaired). Moreover, an unnecessary recharging operation for the dead (impaired) battery pack can be automatically prevented.

Furthermore, the technical scope of the present invention is not limited to the above embodiments, and modifications are permissible within the scope and spirit of the present invention.

For example, although the above embodiments describe, for example, the end-of-battery-life is used an example of a fault in the battery pack 30, the fault in the battery pack 30 is not limited to such end-of-battery-life, and may alternatively include, for example, a predetermined state just before reaching the end of the battery life. In this case, the recharging operation may be stopped or a pop-up window may be displayed in order to inform the user that the battery pack may need to be replaced.

Furthermore, although the above embodiments describe that the notice-image data is used to, for example, inform the user that the battery pack is unusable and to display a button for switching the notebook computer to a sleep mode, the communication portion 6, for example, may alternatively be connected to a customer service section on the Internet so as to receive information related with the further detailed conditions of the battery pack and further services related with the battery pack. Consequently, this leads to an improvement with respect to user-friendliness. Furthermore, in this case, a battery pack that is most suitable for the notebook computer 1 can be purchased via, for example, the Internet.

Furthermore, as described in the above embodiments, the notebook computer 1 defining an electronic device commands the battery pack 30 to send data, and determines the safety of the battery pack 30 based on the data. Based on the determination result, if the notebook computer 1 determines that the battery pack 30 has a fault, the notebook computer 1 stops the recharging operation and displays the pop-up window 41. Alternatively, for example, the controlling unit in the battery pack may sense the fault in the battery pack on its own, and in this case, the controlling unit may send the corresponding data to the notebook computer and directly terminate the recharging operation being performed by the notebook computer. Accordingly, even if an electronic device in which the battery pack is to be installed is not provided with, for example, an automatic recharge-termination function, the electronic device can be prevented from wasting power.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
    a battery-pack installing portion that holds a battery pack in a detachable manner;
    sensing means for sensing that a battery pack is installed in the battery-pack installing portion;
    specification requesting means for requesting predetermined specification data from the installed battery pack;
    detecting means for detecting predetermined specification data responsive to the request, related with a state of the installed battery pack sensed by the sensing means;
    determining means for determining whether the battery pack has a fault by comparing the detected predetermined specification data to manufacturer data stored at the electronic device;
    first restricting means for restricting a recharging operation of the battery pack if the battery pack is determined to have the fault based on the comparison at the determining means; and
    a feature-data requesting means configured to request feature data from the installed battery pack if the battery pack is determined to not have the fault based on the comparison at the determining means,
    wherein said manufacturer data includes predetermined specification data and predetermined feature data of the battery pack, the feature data indicating that the electronic device is to operate in a specified mode when the battery pack is installed.

2. The electronic device according to claim 1, further comprising:
    second restricting means for restricting activation of the electronic device if a removal of the battery pack determined to have the fault is not sensed by the sensing means and when the electronic device is in a non-activated state or in a sleep mode.

3. The electronic device according to claim 2, further comprising:
    display means for displaying notice-image data that gives notice related with the battery pack if the battery pack is determined to have the fault by the determining means.

4. The electronic device according to claim 3, wherein the notice-image data informs that the battery pack is unusable.

5. The electronic device according to claim 4, wherein the notice-image data includes an advice for switching the electronic device to the sleep mode.

6. The electronic device according to claim 5, wherein the notice-image data further includes a button for switching the electronic device to the sleep mode, and wherein the electronic device further comprises:
    third restricting means for setting the electronic device to the sleep mode when the button is pressed.

7. The electronic device according to claim 6, wherein the notice-image data is displayed on a pop-up window.

8. The electronic device according to claim 1, wherein the determining means determining whether or not the predetermined specification data and the predetermined feature data are obtained.

9. The electronic device according to claim 1, wherein said data related with the state of the installed battery pack further includes predetermined safety data of the battery pack.

10. The electronic device according to claim 1, wherein the determining means determines whether the battery pack is in at least in one of states where the battery pack is at an end of its battery life, where the battery pack has a connection failure, and where the battery pack has a control failure.

11. An electronic device comprising:
    a battery-pack installing portion that holds a battery pack in a detachable manner;
    sensing means for sensing that a battery pack is installed in the battery-pack installing portion;
    specification requesting means for requesting manufacturer data from the installed battery pack;
    detecting means for detecting predetermined specification data responsive to the request, related with a state of the installed battery pack sensed by the sending means
    determining means for determining whether the battery pack has a fault by comparing the detected predetermined specification data to manufacturer data stored at the electronic device;
    display means for displaying notice-image data that gives notice related with the battery pack if the battery pack is determined to have the fault based on the comparison at the determining means; and
    a feature-data requesting means configured to request feature data from the installed battery pack if the battery pack is determined to not have the fault based on the comparison at the determining means,
    wherein said manufacturer data includes predetermined specification data and predetermined feature data of the battery pack, the feature data indicating that the electronic device is to operate in a specified mode when the battery pack is installed.

12. A battery pack comprising:
    a second battery that is capable of supplying an electronic device with power;
    recording means for storing at least predetermined manufacturer specification data and predetermined manufacturer feature data of the secondary battery; and
    data output means for outputting the predetermined manufacturer specification data when a first command is received from the electronic device, and outputting manufacturer feature data when a second command is received from the electronic device as a result of a comparison between the predetermined manufacturer specification data and manufacturer data stored at the electronic device, the predetermined manufacturer specification data, being used as a basis for determining whether the battery pack has a fault by the electronic device,
    wherein said manufacturer data includes predetermined specification data and predetermined feature data of the battery pack, the feature data indicating that the electronic device is to operate in a specified mode when the battery pack is installed.

13. The battery pack according to claim 12, wherein the fault in the battery pack corresponds to at least one of the states where the battery pack is at an end of its battery life, where the battery pack has a connection failure, and where the battery pack has a control failure.

14. A power-supply controlling method for an electronic device comprising:
    sensing that a battery pack is installed in a battery-pack installing portion holding the battery pack in a detachable manner;
    requesting manufacturer data and predetermined feature data from the installed battery pack the predetermined feature data including a number of previous recharging operations;
    detecting manufacturer data related responsive to the request with a state of the installed battery pack;
    determining whether the battery pack has a fault by comparing the detected manufacturer data to manufacturer data stored at the electronic device;
    restricting a recharging operation of the battery pack if the battery pack is determined to have the fault based on the comparison; and
    requesting feature data from the installed battery pack if the battery pack is determined to not have the fault based on the comparison, wherein the feature data indicates that the electronic device is to operate in a specified mode when the battery pack is installed.

15. The power-supply controlling method according to claim 14, further comprising:
    displaying notice-image data that gives notice related with the battery pack if the battery pack is determined to have the fault by the determining means.

16. A computer-readable medium including computer program instructions that cause a computer to implement a method of controlling an electronic device, comprising:
    sensing that a battery pack is installed in a battery-pack installing portion holding the battery pack in a detachable manner;
    requesting manufacturer data and predetermined feature data from the installed battery pack the predetermined feature data including a number of previous recharging operations;
    detecting manufacturer data related responsive to the request with a state of the installed battery pack;
    determining whether the battery pack has a fault by comparing the detected manufacturer data to manufacturer data stored at the electronic device;
    restricting a recharging operation of the battery pack if the battery pack is determined to have the fault based on the comparison; and
    requesting feature data from the installed battery pack if the battery pack is determined to not have the fault based on the comparison, wherein the feature data indicates that the electronic device is to operate in a specified mode when the battery pack is installed.

17. An electronic device comprising:
a battery-pack installing portion that holds a battery pack in a detachable manner;
a sensor sensing that a battery pack is installed in the battery-pack installing portion;
a requesting unit configured to request predetermined specification data from the installed battery pack;
a detector detecting predetermined specification data related responsive to the request with a state of the installed battery pack sensed by the sensor;
a determining unit determining whether the battery pack has a fault by comparing the detected predetermined specification data to manufacturer data stored at a memory of the electronic device;
a first restricting unit restricting a recharging operation of the battery pack if the battery pack is determined to have the fault based on the comparison at the determining unit; and
the requesting unit configured to request feature data from the installed battery pack if the battery pack is determined to not have the fault based on the comparison at the determining unit,
wherein said manufacturer data includes predetermined specification data and predetermined feature data of the battery pack, the feature data indicating that the electronic device is to operate in a specified mode when the battery pack is installed.

18. An electronic device comprising:
a battery-pack installing portion that holds a battery pack in a detachable manner;
a sensor sensing that a battery pack is installed in the battery-pack installing portion;
a requesting unit configured to request predetermined specification data from the installed battery pack;
a detector detecting predetermined specification data related responsive to the request with a state of the installed battery pack sensed by the sensor;
a determining unit determining whether the battery pack has a fault by comparing the detected predetermined specification data to manufacturer data stored at a memory of the electronic device;
a display unit displaying notice-image data that gives notice related with the battery pack if the battery pack is determined to have the fault based on the comparison at the determining unit; and
the requesting unit configured to request feature data from the installed battery pack if the battery pack is determined to not have the fault based on the comparison at the determining unit,
wherein said manufacturer data includes predetermined specification data and predetermined feature data of the battery pack, the feature data indicating that the electronic device is to operate in a specified mode when the battery pack is installed.

19. A battery pack comprising:
a secondary battery that is capable of supplying an electronic device with power;
a recording unit storing at least predetermined specification data and predetermined manufacturer feature data of the secondary battery; and
a data output unit outputting the predetermined specification manufacturer specification data when a first command is received from the electronic device, and outputting manufacturer feature data when a second command is received from the electronic device as a result of a comparison between the predetermined manufacturer specification data and manufacturer data stored at the electronic device, the predetermined manufacturer specification data, being used as a basis for determining whether the battery pack has a fault by the electronic device,
wherein said manufacturer data includes predetermined manufacturer specification data and predetermined feature data of the battery pack, the feature data indicating that the electronic device is to operate in a specified mode when the battery pack is installed.

* * * * *